Feb. 16, 1937.  W. C. TROUT  2,071,007

COUNTERBALANCE FOR CRANKSHAFTS

Filed Jan. 17, 1927

Walter C. Trout Inventor

By Jesse R. Stone

Attorney

Patented Feb. 16, 1937

2,071,007

UNITED STATES PATENT OFFICE 2,071,007

COUNTERBALANCE FOR CRANKSHAFTS

Walter C. Trout, Lufkin, Tex.

Application January 17, 1927, Serial No. 161,569

8 Claims. (Cl. 74—591)

My invention relates to a counterbalance for crank shafts and particularly for crank shafts employed on standard well pumping rigs. It serves an important function on pumping rigs where the crank shaft acts to reciprocate a pump rod and also to operate a hoisting apparatus, whereby the pump rod may be pulled from the well.

In pumping operations in deep wells, the weight of the pump rod, the plunger and the load of liquid is ordinarily so great that the drop of the same on the downward stroke causes a decided shock and resulting vibration, tending to injure the rods and pump and cause rapid deterioration to the apparatus.

It is an object of the invention to provide a counterbalance for the load to be lifted by the pump rod reciprocating apparatus, said counterbalance to be mounted upon the crank arm so as to assist both in raising the load on the up stroke and in resisting its drop on the down stroke.

It is also my aim to enable the counterbalancing weight to be easily moved into a position of balance when the crank shaft is employed in hoisting, or for some purpose other than pumping.

Figure 2:
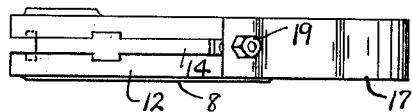
Figure 1:
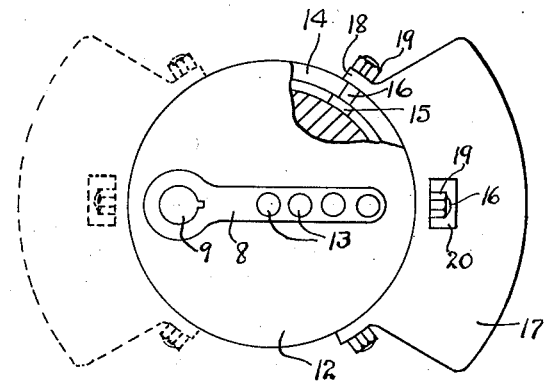
Figure 3:
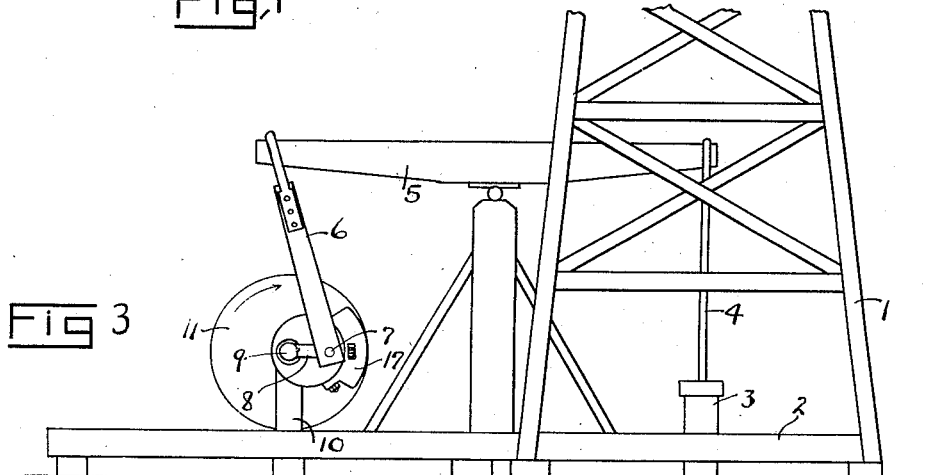

Referring to the drawing herewith, Fig. 1 is a side elevation of a crank arm equipped with my counterbalance thereon. Fig. 2 is a top plan view of the same as it appears in Fig. 1. Fig. 3 is a side elevation showing somewhat diagrammatically the manner in which my counterbalance may be used on pumping rigs. Like numerals of reference are employed to designate like parts in all the views.

My device is designed particularly for use in pumping, although obviously it may be adapted to other somewhat similar uses where a load is to be reciprocated against the weight of gravity. In Fig. 3 I have shown a well derrick 1 having a platform 2 thereon. The upper end of the well casing is indicated at 3. The pump rod 4 is adapted to be reciprocated through a walking beam 5, through a pitman 6, secured to said beam at the end opposite the pump rod and connected at its lower end with a wrist pin 7 upon a crank arm 8. Said crank arm is mounted upon a crank shaft 9 supported for rotation upon the jack posts 10. A band wheel 11 also mounted upon the crank shaft adapts the device for connection with a hoisting drum or other similar apparatus whereby the pump rods may be pulled from the well when desired.

The crank arm 8 in my construction is designed especially for use with my counterbalance. It has formed preferably integrally with the said arm a circular disc 12. Said crank arm is approximately central of the disc so that the peripheral edge of the said disc extends equally from each end of the said arm so that the weight of the said disc will be eccentric relative to the crank shaft 9, upon which the disc is supported. The crank arm has a plurality of openings 13 therein as is usual with this type of apparatus so that the wrist pin may be engaged therein at various positions relative to the shaft.

The disc 12 is of substantial thickness so as to have formed in its peripheral surface a groove 14. This groove is of morticed shape having its inner wall undercut at each side so as to include slidably therein the heads 15 of bolts 16. These bolts are adapted to secure adjustably upon the periphery of said disc a weight 17. As shown in Fig. 1, this weight is preferably formed of arcuate shape, the inner edge thereof being shaped to fit the other periphery of the disc. It has laterally extending lugs 18 thereon provided with openings to receive the bolts 16, whereby the nuts 19 on said bolts may secure the weight rigidly to the disc at any desired position thereon. I may provide a central opening 20 in the weight to allow a central bolt 16 to extend therethrough and receive the nut 19.

In the operation of my device, the weight will ordinarily be placed in position, shown in Figs. 1 and 3, so that when the pump rod is being raised through the rotation of the crank shaft, the weight 17 will be in position to assist in the raising of the load. It will also be noted that when the crank arm has rotated into position where the load is dropping on the down stroke, the weight of the member 17 will act to resist the sudden drop thereof so that jar or vibration upon the pumping apparatus will be largely eliminated. It is obvious that the position of the weight upon the disc may be varied as desired and when the pump is disconnected from the crank arm and the band wheel is employed for hoisting purposes or other operations about the well, the weight may be moved into dotted line position, shown in Fig. 1, and in that position it will balance the weight of the crank arm and the disc and will have a fly wheel effect in balancing the rotation of the shaft. It will be obvious that the weight may be shifted without difficulty and all that will be necessary to accomplish a change in position of the weight will be to loosen the nuts upon the bolts 16 and slide the weight around the periphery of the disc to the desired position.

Various sizes of weights may be used and more than one weight may be attached to the disc if desired. The advantages of this construction will be apparent to those skilled in the art.

It will be noted that I have provided a counterbalance weight which may remain upon the crank shaft in the position shown so as to counterbalance the weight of the load which is reciprocated and which may be shifted from that position when the crank shaft is employed for other purposes where the counterbalance is not needed.

Having thus described my invention, what I claim as new and desire to protect by Letters Patent is:

1. In a device of the character described a crank shaft, a crank arm thereon, a load reciprocating means connected therewith, a circular support formed on said crank arm and shaft, a weight mounted on said support, and a means whereby said weight may be adjusted about said support to balancing or counterbalancing positions on said support, said support being eccentrically mounted on said shaft.

2. In a device of the character described a crank shaft, a crank arm thereon, a circular support eccentrically formed about said crank shaft and supported by said shaft, and a weight on said support, and means to attach said weight so that it is adjustable about the periphery thereof.

3. In a counterbalance for crank shafts, a disc carried by the crank shaft, said disc being mounted eccentrically on said shaft, a plurality of openings therein whereby the load may be connected thereto, and an adjustable counterweight mounted on said disc whereby adjustment serves to vary the effectiveness of said weight as a counterbalance.

4. In a counterbalance for crank shafts, eccentric means extending radially from the crank shaft and rotatable thereby, a weight, means connecting said eccentric and said weight whereby said weight is adjustably mounted on said means whereby the degree of balancing or counterbalancing may be varied by eccentric adjustment of said weight relative to said shaft.

5. In a device of the character described a crank shaft, a crank arm thereon adapted to reciprocate a load, an eccentric disc on said shaft forming a part of said arm and surrounding the same, said disc having a peripheral groove therein, and a weight slidable in said groove to any desired position relative to said arm and shaft.

6. In a counterbalance for crank shafts, a radially extending member mounted on and rotatable with said crank shaft, a weight, and connecting means for said weight and member whereby said weight may be radially and circumferentially adjustable upon said member.

7. In a counterbalance for crank shafts, a radially extending member mounted on and rotatable with said crank shaft, a weight, and connecting means for said weight and member whereby said weight may be circumferentially positioned to obtain the desired balance, said member being eccentric on said shaft to vary the moment arm of the weight upon circumferential adjustment thereof.

8. In a crank shaft for well pumping equipment, a counterbalance device including a crank disc, a plurality of openings in said disc whereby the load may be connected thereto, said disc being eccentrically mounted upon said crank shaft, a weight member, and means for adjustably attaching said weight member to said disc.

WALTER C. TROUT.